No. 658,119. Patented Sept. 18, 1900.
W. H. PARSONS.
BICYCLE BRAKE.
(Application filed June 25, 1900.)
(No Model.)
Fig.1.
Fig.2.
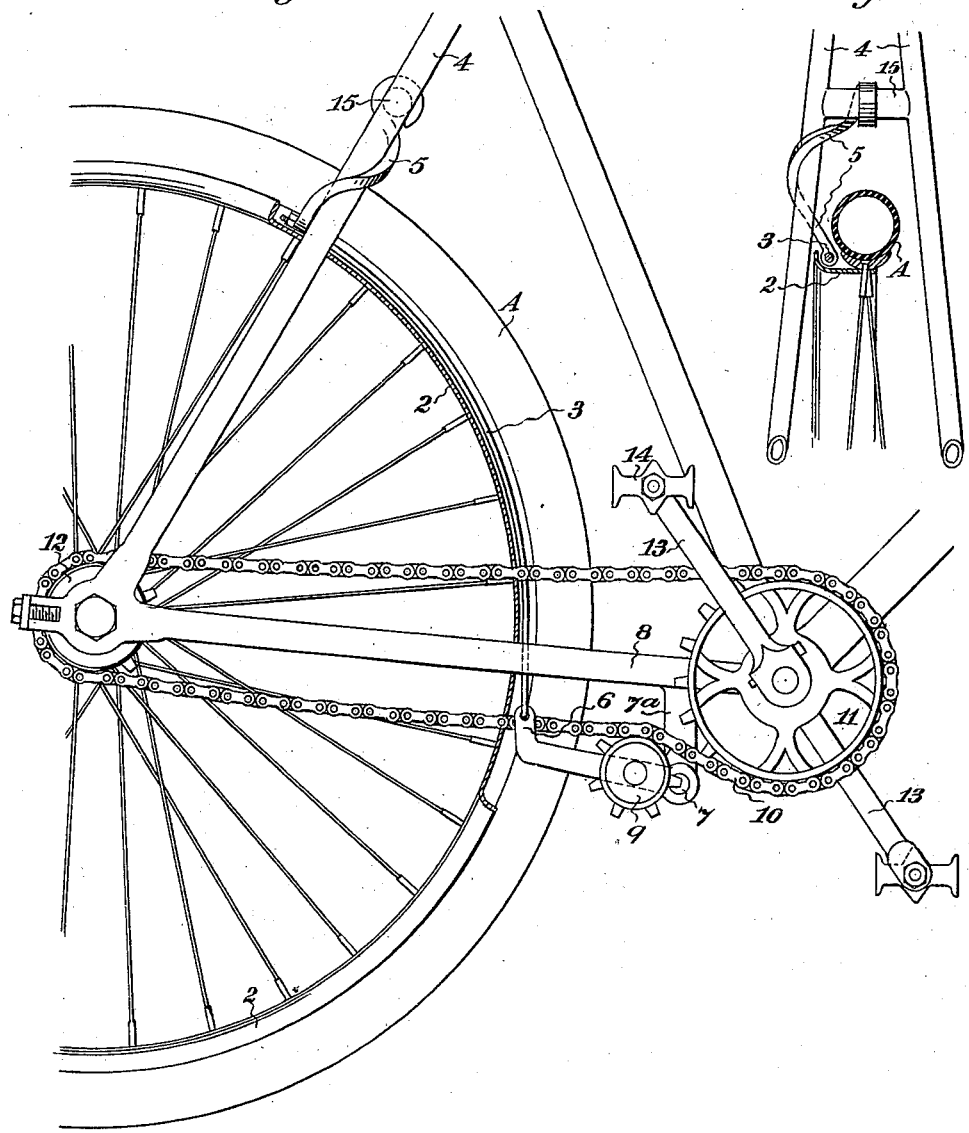
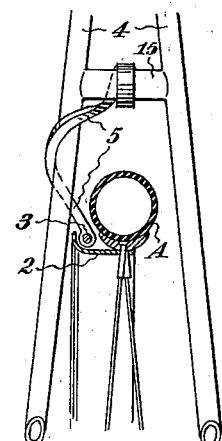
Witnesses,
Inventor,
William H. Parsons
By Dewey Strong & Co.
Atty

UNITED STATES PATENT OFFICE.

WILLIAM H. PARSONS, OF GREAT WESTERN MINE, CALIFORNIA.

BICYCLE-BRAKE.

SPECIFICATION forming part of Letters Patent No. 658,119, dated September 18, 1900.

Application filed June 25, 1900. Serial No. 21,476. (No model.)

*To all whom it may concern:*

Be it known that I, WILLIAM H. PARSONS, a citizen of the United States, residing at Great Western Mine, county of Lake, State of California, have invented an Improvement in Bicycle-Brakes; and I hereby declare the following to be a full, clear, and exact description of the same.

My invention relates to an improved brake for bicycles and means for operating the same.

It consists of a supplemental rim or extension carried by the driving-wheel of the machine, a segmental band having one end fixed to the upwardly-extending fork of the machine, and a fulcrumed lever to which the other end of said band is attached. A sprocket-wheel is turnably journaled upon said lever in line with the lower part of the driving-chain, where it passes between the pedal-shaft and rear-axle sprockets, so that when the pedals are pressed backwardly or against the forward movement of the machine the tension of the chain thus produced will press upon the sprocket, acting through it upon the lever and upon the band, so as to apply the brake.

My invention also comprises details of construction which will be more fully explained by reference to the accompanying drawings, in which—

Figure 1 is a side elevation showing a portion of the rear-wheel-frame driving-sprockets, chain, and my attachment. Fig. 2 is a front view showing a sectional view of part of the wheel-rim with my attachment.

A is the rear wheel of the machine, having fixed around its rim in any suitable manner a supplemental rim 2. Within this rim is a flexible band 3, one end of which is adjustably supported by the rear upwardly-extending fork 4 by means of a holder 5, the lower end of which is perforated to allow the end of the band 3 to pass through it, and the band 3 is secured by a nut, and adjustment may be made by means of this nut. The part 5 coils around one of the upwardly-extending rear forks a partial revolution, thence extends over the uniting cross-bar 15, which extends between the forks 4, and is coiled around this bar. This provides a sufficiently firm and easily-removable support for the band 3. The lower end of this band, which lies in the rim or trough 2, is connected with the free end of a lever 6. The opposite end of this lever is pivoted, as shown at 7, to a bracket 7ª, this bracket being fixed to or supported from the horizontal rear fork 8 of the machine. Upon the lever 6 is journaled to turn freely a small sprocket-wheel 9. The position of the lever is such that the sprocket-wheel 9 is in the line of travel of the chain 10, which chain passes over the crank-shaft sprocket 11 and the rear sprocket 12.

13 are the cranks, and 14 is one of the pedals.

The lower portion of the chain 10 passes over the sprocket 9 and when the machine is being driven forwardly the tension being upon the upper part of the chain 10 will apply the pull from sprocket 11 to sprocket 12, and thus revolve the bearing and driving wheel A. The slack of the chain then runs loosely over the sprocket 9 without any pressure and the elasticity of the band 3 and its connection is sufficient to cause it to be lifted out of frictional contact with the rim 2. When, however, it is desired to check the machine, the rider applies pressure against the rising pedal, as at 14, and the tendency is to pull the lower part of the chain 10 into a straight line between the sprockets 11 and 12, the upper part of the chain then becoming correspondingly slack. As the small sprocket 9 is above a straight line between the lower sides of the sprockets 11 and 12, the straightening and tension upon the chain 10 will bring a pressure upon the sprocket 9, which is transmitted to the lever 6, upon which it is fulcrumed, and this produces a tension upon the band 3, which forces it into frictional contact with the rim 2 and with sufficient pressure to check the wheel and eventually bring it to a stop.

The band 3 and the rim with which it contacts may be made of any suitable or desired shape. I have found that a segmental rim and a round wire or equivalent part 3 are very suitable for such a brake; but it will be manifest that these parts may be made in any other form without materially altering the character of my invention.

Having thus described my invention, what I claim as new, and desire to secure by Letters Patent, is—

1. The combination with a bicycle of a supplemental rim carried by the rear wheel, a fulcrumed lever having a sprocket-wheel loosely turnable thereon, a band having one end connected with the free end of said lever and the other connected to a fixed support upon the frame, said band lying in the supplemental rim or channel, a chain passing over the main driving-sprockets and the intermediate sprocket carried upon the lever whereby tension upon this portion of the chain acts through the sprocket upon the lever to force the brake-band into frictional contact with its rim.

2. In a bicycle-brake, a supplemental rim carried upon the rear wheel, a lever having one end fulcrumed in supports or brackets on the rear fork, a driving-chain passing around the crank and rear-wheel sprockets, a toothed sprocket loosely pivoted upon the fulcrumed lever with its teeth in line to be engaged by the lower part of the chain as it moves, a band having one end connected with the free end of the sprocket-carrying lever, a support with which the opposite end of the band is adjustably connected, said support coiling around the fork and rear brace of the frame and perforated for the attachment of the frictional band.

In witness whereof I have hereunto set my hand.

WILLIAM H. PARSONS.

Witnesses:
S. W. KENYON,
F. MAEDE.